United States Patent [19]

Snow

[11] 3,828,997

[45] Aug. 13, 1974

[54] APPARATUS FOR POSITIVELY CONVEYING SHEET MATERIALS

[75] Inventor: Gerald A. Snow, Cumberland, Maine

[73] Assignee: United Industrial Syndicate, Inc., Portland, Maine

[22] Filed: May 30, 1973

[21] Appl. No.: 365,224

[52] U.S. Cl. .............................................. 226/172
[51] Int. Cl. ........................................... B65h 17/34
[58] Field of Search ...................... 226/74, 171, 172

[56] References Cited
UNITED STATES PATENTS
3,209,972  10/1965  Benbow ............................. 226/74
3,669,327  6/1972  Dowd ............................. 226/172 X

*Primary Examiner*—Robert S. Ward, Jr.
*Assistant Examiner*—Gene A. Church

[57] ABSTRACT

Apparatus for conveying sheet materials that must be securely held by its margins to ensure its positive advance, through a thermoformer for one example has supporting and hold down conveyors. Each conveyor consists of transversely spaced chains of the roller type trained about sprockets and means are provided maintaining their proximate courses in gripping relation with the margins of the conveyed material. The chains of one conveyor have teeth disposed and dimensioned to pierce the material without interference from the chains of the other conveyor and to extend in back of appropriate ones of their links. The sprockets of the two conveyors are arranged so that the material is engaged by the conveyor whose chains have the teeth before and remains in engagement therewith after the material is also in engagement with the other conveyor.

4 Claims, 5 Drawing Figures

APPARATUS FOR POSITIVELY CONVEYING SHEET MATERIALS

BACKGROUND OF THE INVENTION

While conveying apparatus in accordance with the invention is for use wherever sheet materials must be marginally supported and positively advanced and particularly where the treatment of the material being conveyed develops transverse shrinkage stresses, it is herein discussed with particular reference to its use in thermoformers.

When articles are produced in a thermoformer, the sheet material, foamed plastic, for example, must be positively advanced through it while gripped at its margins so that the conveying means will not interfere with the thermoforming or blanking operations. It is also essential to prevent transverse shrinkage forces from pulling the sheet material from the edge-gripping means, and, at the present time, two different types of such means are employed.

In one such type, supporting and hold down conveyors are employed with each conveyor consisting of transversely spaced chains of the roller type trained about sprockets with the proximate courses of corresponding chains held in a material gripping relationship and with the chains of one conveyor having teeth that bite into the gripped material. See for example, U.S. Pat. No. 3,688,963, dated Sept. 5, 1972.

In the other type of edge-gripping means, laterally spaced supports are used in place of a supporting conveyor to underlie the margins of the sheet material and the chains of the hold down conveyor have teeth dimensioned to pierce the thus supported sheet material and to enter channels extending lengthwise of the supports. See for example U.S. Pat. No. 3,348,748.

In either type, the conveying means may be advanced by separate indexing means or by the use of sprocket drives but neither type of edge-gripping means has proved satisfactory with such sheet materials as oriented polystyrene where the heat treatment results in transverse shrinkage of a magnitude such that frequently a margin will pull free from its gripping means completely disrupting the operation of the thermoformer. In addition, in sheet conveying means where the sheet material is in sliding contact with lengthwise supports, additional problems are created by friction aggravated by the sheet material becoming somewhat tacky when heated.

See also U.S. Pat. No. 1,763,735, dated June 17, 1930.

THE PRESENT INVENTION

The objective of the invention is to provide conveying apparatus that positively grip and hold the margins of sheet material without frictional resistance to its travel even if of a type that is subject to transverse shrinkage forces as a result of its treatment that are of a magnitude such that previous types of edge-gripping means have been unable to resist.

In accordance with the invention, this objective is attained with conveying apparatus provided with supporting and hold down conveyors, each having transversely spaced chains trained about sprockets with the proximate course of corresponding chains of the two conveyors yieldably gripping the margins of the sheet material between them. The chains of one conveyor are provided with teeth disposed and dimensioned to pierce the gripped material without interference from the corresponding chains of the other conveyor and to extend in back of appropriate ones of their links.

Another objective of the invention is to ensure against such interference by offsetting the teeth of the chains of said one conveyor relative to the links of the corresponding chains of the other conveyor in back of which they are to extend, an objective preferably attained by offsetting slightly the corresponding chains of the two conveyors.

A further objective of the invention is to prevent the teeth from slitting the material as it is being pierced, an objective attained by positioning the sprockets of the conveyor having tooth-equipped chains located so that the corresponding sprockets of the other conveyor are between the ends thereof in order that the teeth may have a position normal to the sheet before the edge-gripping means becomes fully operative.

BRIEF DESCRIPTION OF THE DRAWINGS

In the accompanying drawings, a preferred embodiment of the invention is illustrated of which

Figure 1:
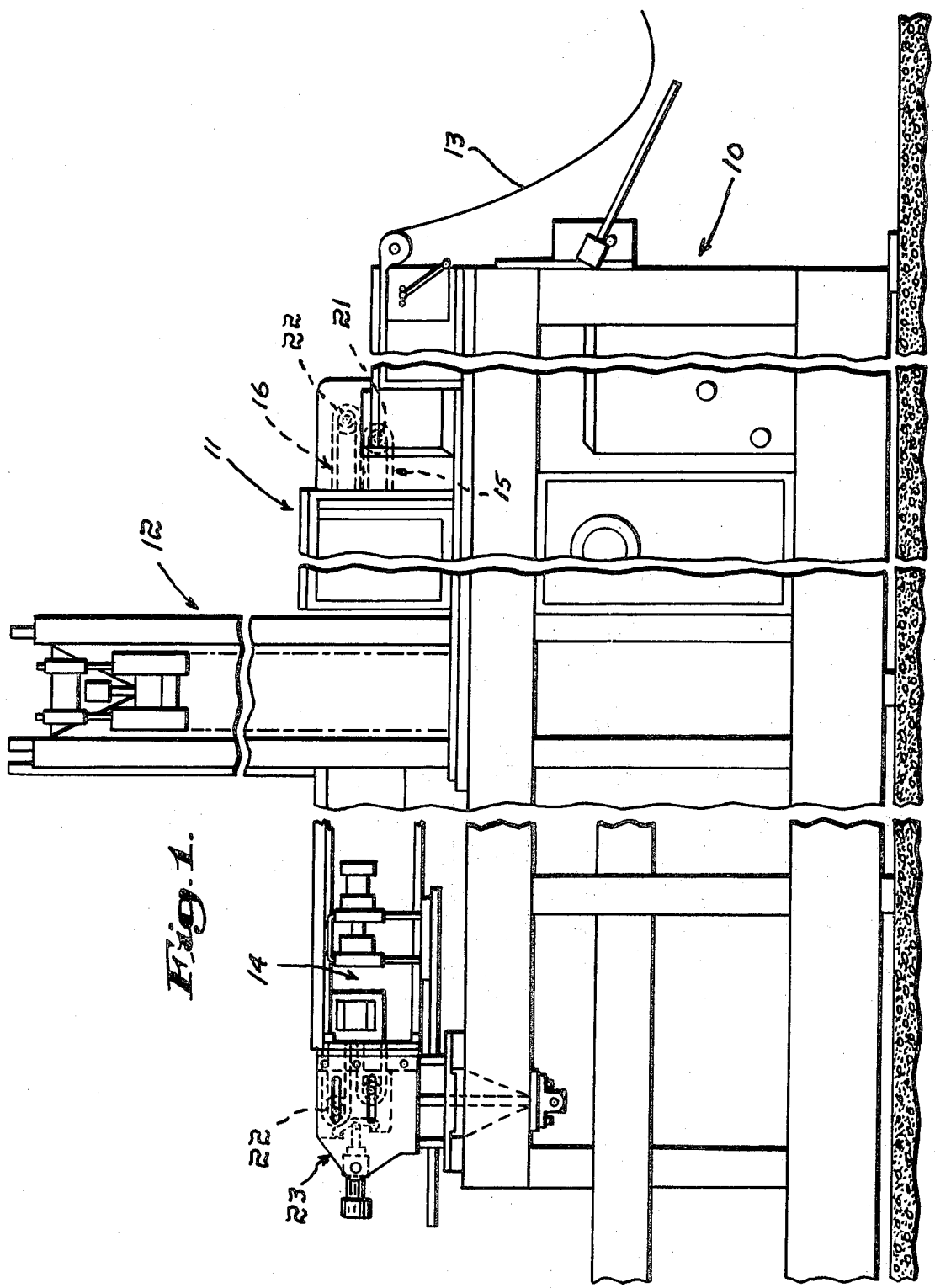
FIG. 1 is a side view of a typical thermoformer, the thermoformer being broken away to foreshorten the drawing.

As the invention is particularly concerned with conveying sheet materials that are subject, as a consequence of treatment, a heating treatment for example, to transverse shrinkage forces of substantial magnitude, the conveying means is illustrated as incorporated in a thermoformer 10. Such a thermoformer may be generally of the type shown and described in United States Letters Pat. No. 3,504,074, dated Mar. 31, 1970, and has several stations of which the heating and forming stations are generally indicated at 11 and 12, respectively. Such a thermoformer also has conveying means to withdraw sheet material 13 such as oriented polystyrene, from a roll thereof, and means generally indicated at 14 to advance the conveying means, in the case of a thermoformer, with appropriate dwells at the stations desirably effected by indexing means, and, for one example, the type described in U.S. Letters Pat. No. 3,688,963.

The conveying means comprises a supporting conveyor, generally indicated at 15 and a hold down conveyor, generally indicated at 16 and as these are to grip the margins of the sheet material 13 through a substantial part of its travel through the thermoformer 10 and to engaged by the indexing means 14, both conveyors are also shown as consisting of transversely spaced pairs of roller chains. The chains of the two pairs of the supporting conveyor 15 are indicated generally at 17 and 18 in FIG. 3 and those of the hold down conveyor 16 are generally indicated at 19 and 20. The pairs of chains of the conveyors 15 and 16 are trained about double sprockets 21 and 22, respectively. The sprockets 21 and 22 adjacent one end of the thermoformer 10 are under the control of chain tensioning means, generally indicated at 23 and best seen in FIG. 4. It will be noted that the ends of the conveyor 16 extend slightly beyond the ends of the conveyor 15 for reasons subsequently to be set forth. All of the chains are or may be conventional roller chains except as hereinafter noted. The corresponding rollers 24 of each pair of chains of the hold down conveyor 16 are interconnected by common axles 25. Each axle 25 also connects two links at each end of its two rollers 24 the overlapping links 26 and the overlapped links 27. As the chains of the supporting conveyor 15 are the same as those just described, its corresponding parts are distinguished by the suffix addition "A" to the appropriate reference numerals.

Figure 2:
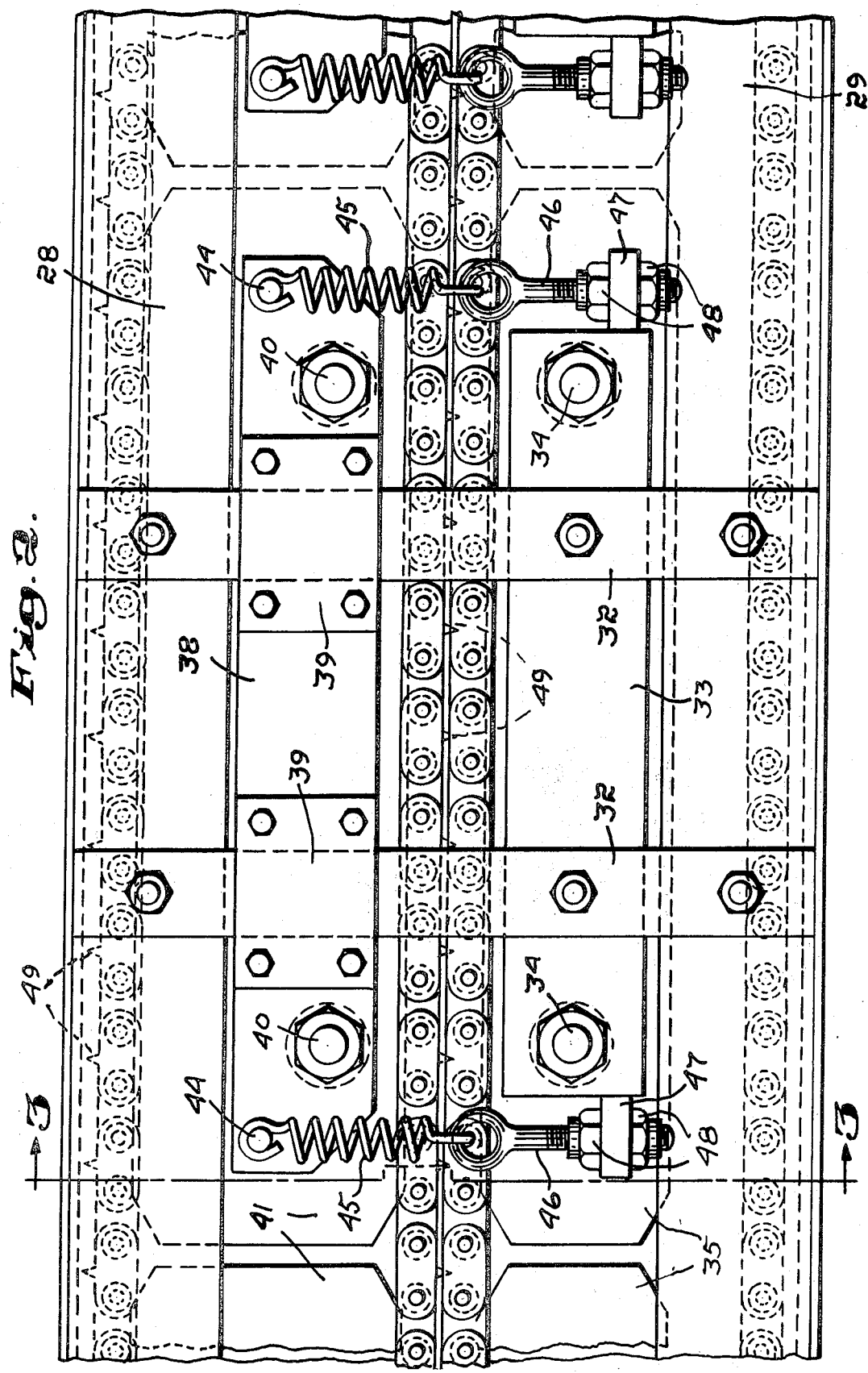
FIG. 2 is a fragmentary side view of the chains of the supporting and hold down conveyors at one side of the thermoformer.
Figure 3:
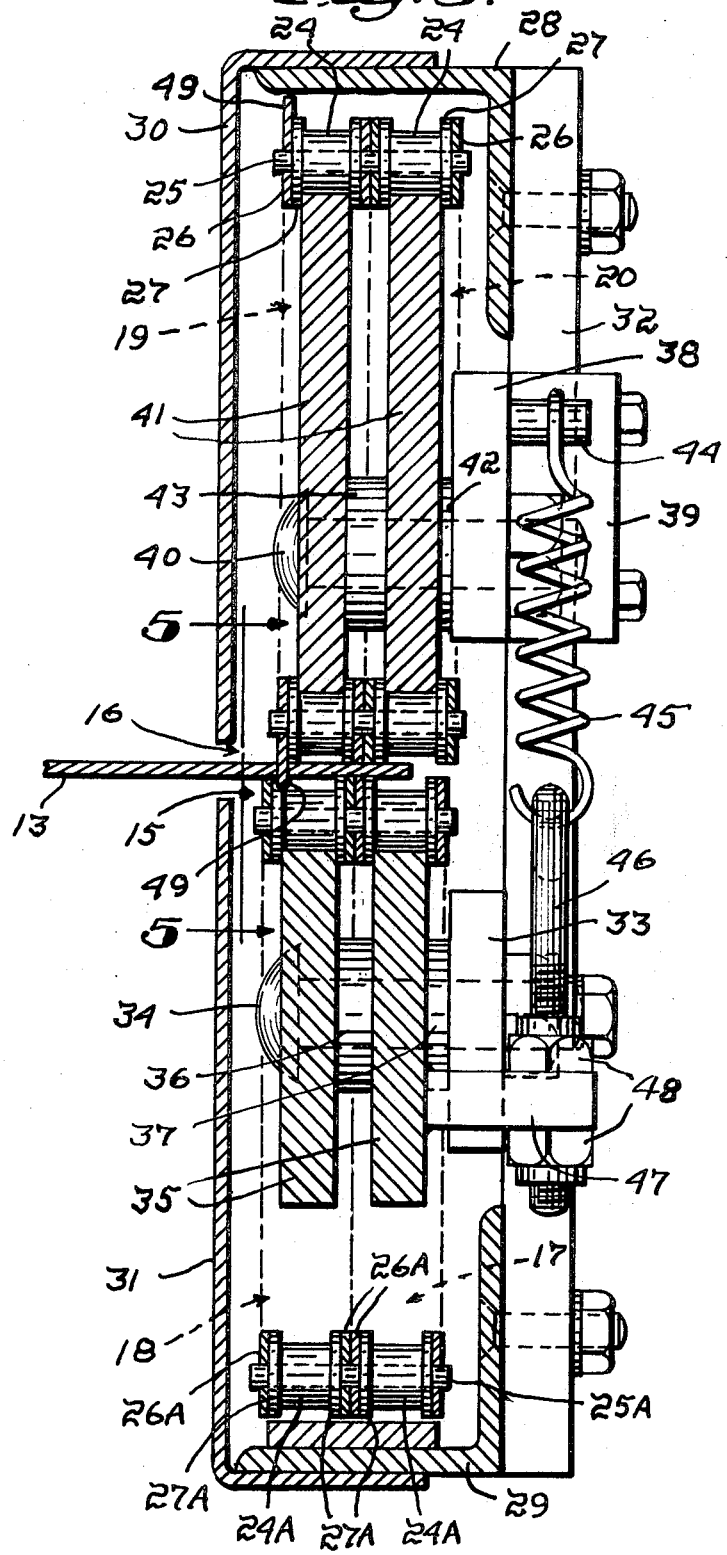
FIG. 3 is a section taken approximately along the indicated line 3—3 of FIG. 2.
Figure 4:
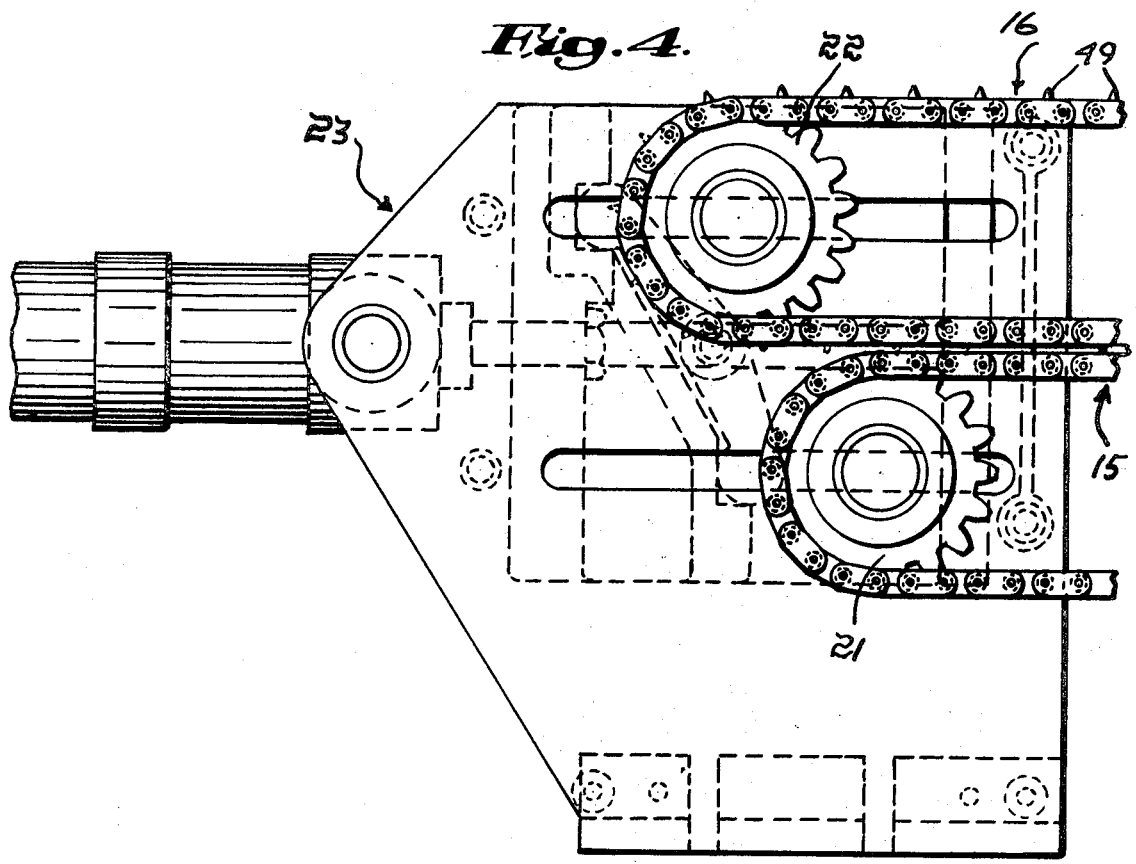
FIG. 4 is a fragmentary side view of one end of the two conveyors.

The remote courses of the chains of the two conveyors are protected by upper and lower shields 28 and 29, see FIGS. 2 and 3, and these support inner walls 30 and 31, respectively, and are interconnected by a series of pairs of upright members 32 to which a lengthwise series of spaced bars 33 are bolted. Each bar 33 has a pair of bolts 34 in support of a pair of horizontal rails 35 spaced transversely from each other and from the bar 33 by spacers 36 and 37 through which the bolts 34 pass, the spacers enabling the rollers of both chains of the supporting conveyor 15 to rest on and travel along the appropriate one of the rails 35 as will be apparent from FIG. 3.

A series of bars 38 are provided, one above each bar 33 with keepers 39 slidably connecting it to two of the members 32. Each bar 38 has a pair of transversely disposed bolts 40 supporting a pair of shoes 41, one spaced from its bar 38 by a spacer 42 and from the other shoe 41 by a spacer 43, the spacers 42 and 43 positioning the shoes 41 to engage the rollers of both chains of the hold down conveyor 16. It will be noted that the spacing of the shoes 41 is such that the chains of the hold down conveyor 16 are laterally offset slightly relative to the chains of the supporting conveyor 15 for reasons presently to be set forth.

At each end of each bar 38 there is a pin 44 to which a spring 45 is connected, each spring 45 is also connected to an eye bolt 46 extending through supports 47 at both ends of each bar 33 and adjustably secured thereto by nuts 48 thus enabling the pressure on the hold down shoes 41 to be adjusted as desired, such pressure ensuring that the proximate courses of the supporting and hold down conveyors exert adequate edge-gripping pressure on the margins of the sheet material 13.

Figure 5:
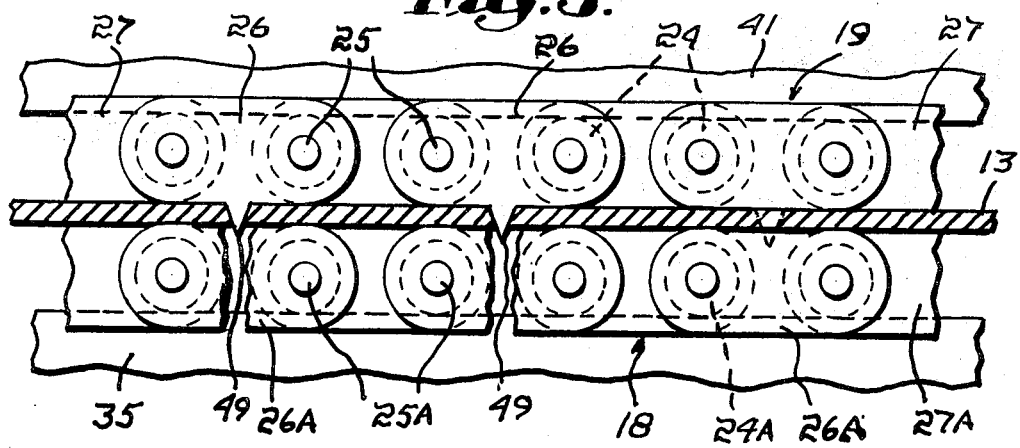
FIG. 5 is a fragmentary view on a substantial increase in scale, taken approximately along the indicated lines 5—5 of FIG. 3.

While the edge-gripping means just described are effected to ensure the positive advance of the sheet material, such materials as oriented polystyrene would pull free therefrom once so heated as to cause it to start to shrink transversely of its path through the thermoformer 10. For that reason, the proximate chains 19 of the hold down conveyor 16 are shown as having their innermost links 26 provided with teeth 49 disposed and dimensioned to pierce the sheet 13 and to enter the space in back of but so close to the corresponding links 26A of the proximate chains 17 as to be almost in contact therewith, see FIGS. 3 and 5. Such entry is most readily effected by the above referred to slight off-setting of the shoes 41 and the sprocket 22 relative to the rails 35 and the sprockets 21. It will be noted that the teeth 49 have a relatively long base thus to have a substantial area of contact with the sheet material 13 for maximum effectiveness in holding it against shrinking transversely. Transverse shrinkage forces exerting a pull on the teeth 49 are effectively opposed by the resulting engagement of the teeth 49 with the proximate links 26A of the proximate chains 17. As may best be seen in FIG. 5, the edge of the links 26A in back of which the teeth 49 enter are straight and desirably both edges of the links of the several chains are straight.

While it is desirable to have the teeth 49 relatively wide and long, it is also essential that the sheet be not weakened by the teeth slitting the sheet material as they pierce it or become disengaged therefrom. That undesirable result is avoided by providing that the hold down conveyor 16 is slightly longer than the supporting conveyor 15 so that, in the first instance, the teeth 49 are normal to the sheet material before it is caught between the two conveyors and in the second instance, the sheet material is released before the two start to swing from said normal relationship therewith.

I claim:

1. Apparatus for conveying sheet material, said apparatus comprising a supporting conveyor and a hold down conveyor, each conveyor including laterally spaced roller chains, sprockets about which the chains are trained, and means holding the proximate courses of the corresponding chains in gripping relationship with the margins of the sheet material, said means comprising rails in supporting engagement with the rollers of the chains of the supporting conveyor and shoes in holding engagement with the rollers of the chains of the hold down conveyor, corresponding shoes and rails of the two conveyors being offset relative to each other, and the chains of one conveyor including a series of teeth spaced lengthwise of and extending from end-to-end thereof, each tooth extending from a link of said one conveyor and disposed and dimensioned to extend through the gripped material into a position in which it is held captive in back of a link of the appropriate chain of the other conveyor due to said offset thereby to offset any transverse shrinkage forces developing in the conveyed sheet.

2. The apparatus of claim 1 in which the conveyor whose chains include the teeth is longer than the other conveyor by a distance such that the teeth are in a position normal to subjacent sheet material before such subjacent material is engaged by said other conveyor and the sheet material is free of said other conveyor before said teeth move from said normal position.

3. The apparatus of claim 1 in which the chains at each side of each conveyor are double chains interconnected by common points, the sprockets are double sprockets, the outer chains of both conveyors are used to effect the advance of the material, the inner chains of one of said conveyors include the teeth.

4. The apparatus of claim 1 in which the links which have the teeth are the inner links and the links that hold the two captive are also inner links.

* * * * *